United States Patent
Bogner et al.

(10) Patent No.: US 10,900,497 B2
(45) Date of Patent: Jan. 26, 2021

(54) COMPRESSOR FOR A CHARGING DEVICE OF AN INTERNAL COMBUSTION ENGINE AND CHARGING DEVICE FOR AN INTERNAL COMBUSTION ENGINE

(71) Applicant: Vitesco Technologies GMBH, Hannover (DE)

(72) Inventors: Mathias Bogner, Straubing (DE); Christoph Schäfer, Coburg (DE); Sasa Slavic, Heidelberg (DE)

(73) Assignee: Vitesco Technologies GmbH, Hannover (DE)

( * ) Notice: Subject to any disclaimer, the term of this patent is extended or adjusted under 35 U.S.C. 154(b) by 0 days.

(21) Appl. No.: 16/815,478

(22) Filed: Mar. 11, 2020

(65) Prior Publication Data

US 2020/0208650 A1 Jul. 2, 2020

Related U.S. Application Data

(63) Continuation of application No. PCT/EP2018/070255, filed on Jul. 26, 2018.

(51) Int. Cl.
*F04D 29/46* (2006.01)
*F01D 17/14* (2006.01)
(Continued)

(52) U.S. Cl.
CPC ......... *F04D 29/464* (2013.01); *F01D 17/141* (2013.01); *F04D 17/10* (2013.01);
(Continued)

(58) Field of Classification Search
CPC .... F04D 29/464; F04D 27/0253; F04D 17/10; F04D 29/4213; F01D 17/141;
(Continued)

(56) References Cited

U.S. PATENT DOCUMENTS

| 2007/0231125 A1 | 10/2007 | Oeschger et al. |
| 2010/0196145 A1 | 8/2010 | Lombard et al. |
| 2016/0265424 A1 | 9/2016 | Tingaud et al. |

FOREIGN PATENT DOCUMENTS

| DE | 102011121996 A1 | 6/2013 |
| DE | 102012011423 B3 | 11/2013 |
| WO | 2016041024 A2 | 3/2016 |

OTHER PUBLICATIONS

International Search Report and Written Opinion dated Oct. 29, 2018 from corresponding International Patent Application No. PCT/EP2018/070255.

*Primary Examiner* — Audrey K Bradley
*Assistant Examiner* — Edward Bushard

(57) ABSTRACT

A compressor is disclosed for a charging device of an internal combustion engine. An iris diaphragm mechanism is arranged upstream of the compressor wheel. An actuator is mechanically coupled to an adjusting ring of the iris diaphragm mechanism for transmitting torque of an actuator shaft to the adjusting ring for rotating the adjusting ring. A pivotable coupling pin is arranged eccentrically on the actuator shaft and has a bearing bush which is displaceable along a longitudinal axis of the coupling pin. The bearing bush is mounted between two fingers of an adjusting lever of the adjusting ring so as to be displaceable along the fingers. An outer contact surface of the bearing bush is spherical. Inner contact surfaces of the two fingers are cylindrical to correspond to the spherical outer contact surface of the bearing bush and are in sliding contact with the outer contact surface of the bearing bush.

12 Claims, 6 Drawing Sheets

(51) Int. Cl.
*F04D 17/10* (2006.01)
*F04D 29/42* (2006.01)
*F16K 3/03* (2006.01)

(52) U.S. Cl.
CPC ...... *F04D 29/4213* (2013.01); *F05D 2220/40* (2013.01); *F05D 2250/51* (2013.01); *F16K 3/03* (2013.01)

(58) Field of Classification Search
CPC ............ F05D 2220/40; F05D 2250/51; F05D 2260/57; F16K 3/03; Y02T 10/12; F02B 39/04; F02B 39/16; F02B 37/225; F02B 39/10
See application file for complete search history.

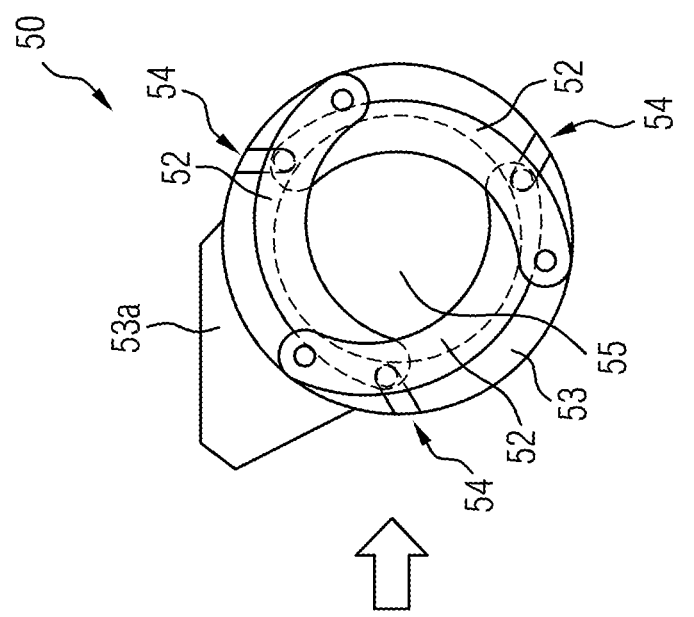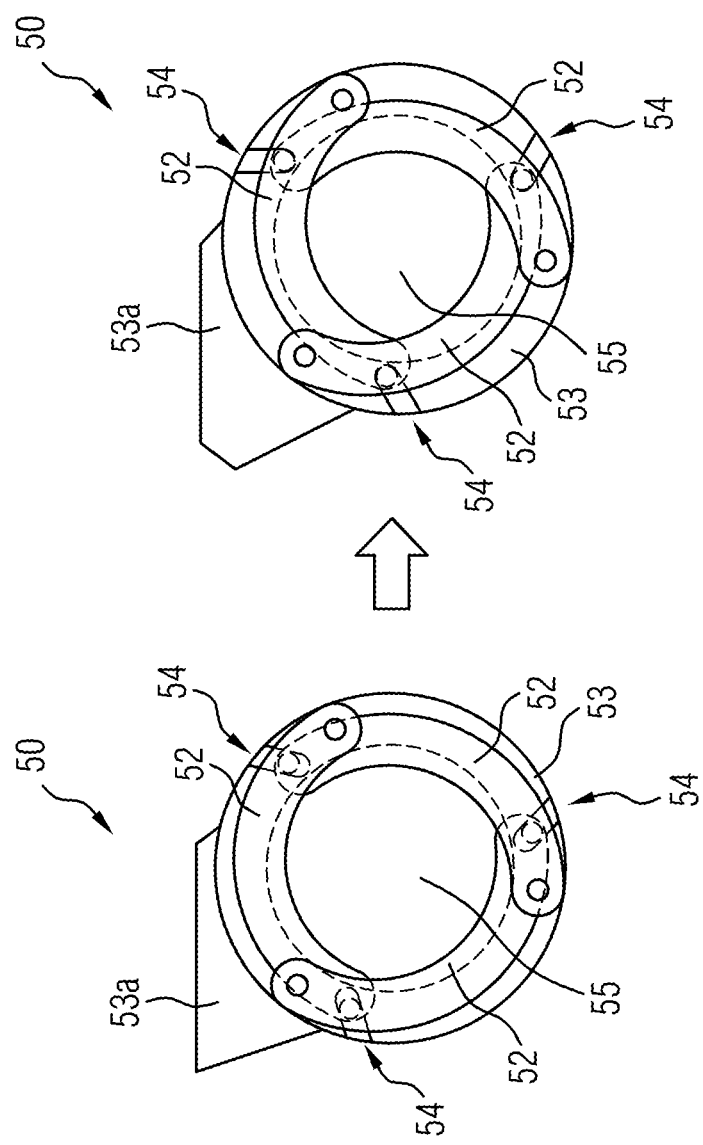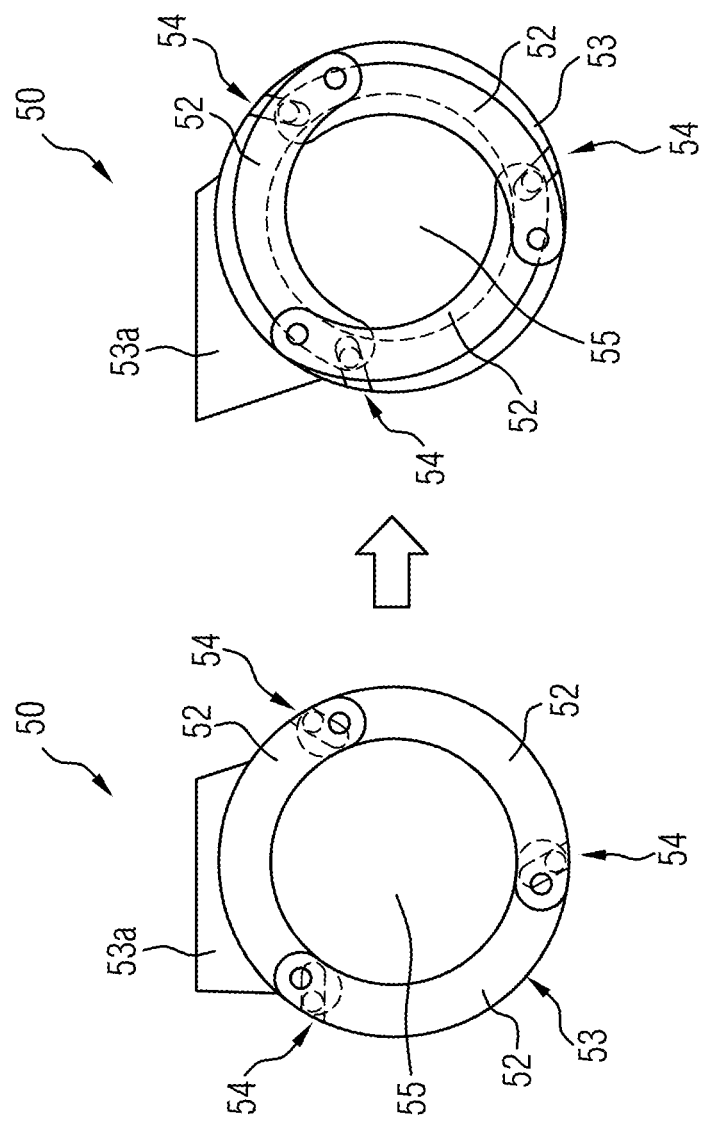

COMPRESSOR FOR A CHARGING DEVICE OF AN INTERNAL COMBUSTION ENGINE AND CHARGING DEVICE FOR AN INTERNAL COMBUSTION ENGINE

CROSS REFERENCE TO RELATED APPLICATIONS

This application claims the benefit of PCT Application PCT/EP2018/070255, filed Jul. 26, 2018, which claims priority to German Application DE 10 2017 216 332.1, filed Sep. 14, 2017. The disclosures of the above applications are incorporated herein by reference.

FIELD OF INVENTION

The invention relates to a compressor for a charging device of an internal combustion engine and to a charging device for an internal combustion engine.

BACKGROUND

Charging devices such as exhaust-gas turbochargers are increasingly being used to increase power in motor vehicle internal combustion engines. More and more frequently, this is done with the aim of reducing the overall size and weight of the internal combustion engine for the same power or even increased power and, at the same time, of reducing consumption and thus $CO_2$ emissions, with regard to ever stricter legal requirements in this respect. The principle of action consists in using the energy contained in the exhaust-gas flow to increase a pressure in an intake tract of the internal combustion engine and thus to bring about better filling of a combustion chamber of the internal combustion engine with atmospheric oxygen. In this way, more fuel, such as gasoline or diesel, can be converted in each combustion process, i.e. the power of the internal combustion engine can be increased.

An exhaust-gas turbocharger has an exhaust-gas turbine arranged in the exhaust tract of the internal combustion engine, a fresh-air compressor arranged in the intake tract and a rotor bearing arranged therebetween. The exhaust-gas turbine has a turbine housing and a turbine impeller arranged therein, which is driven by the exhaust-gas mass flow. The fresh-air compressor has a compressor housing and a compressor impeller arranged therein, which builds up a boost pressure. The turbine impeller and the compressor impeller are arranged for conjoint rotation on the opposite ends of a common shaft, referred to as the rotor shaft, and thus form what is referred to as the turbocharger rotor. The rotor shaft extends axially between the turbine impeller and compressor impeller through the rotor bearing arranged between the exhaust-gas turbine and fresh-air compressor, and is rotatably mounted in said rotor bearing in the radial and axial directions in relation to the rotor shaft axis. According to this construction, the turbine impeller driven by the exhaust-gas mass flow drives the compressor impeller via the rotor shaft, thereby increasing the pressure in the intake tract of the internal combustion engine, behind the fresh-air compressor in relation to the fresh-air mass flow, and thereby ensuring better filling of the combustion chamber with atmospheric oxygen.

In terms of its operating behavior, the compressor is characterized by a so-called compressor characteristic map, which describes the pressure build-up versus the mass throughput for different compressor rotational speeds or circumferential speeds. A stable and usable characteristic map of the compressor is bounded toward low throughputs by the so-called surge limit, toward relatively high throughputs by the so-called choke limit, and in terms of structural mechanics by the maximum rotational speed limit. In adapting a charging device such as an exhaust-gas turbocharger to an internal combustion engine, a compressor is selected which has a compressor characteristic map which is as expedient as possible for the internal combustion engine. The following preconditions should be satisfied here:

an engine full-load curve is to be completely within the usable compressor characteristic map;

minimum clearances with respect to the characteristic map limits, as required by the vehicle manufacturer, are to be maintained;

maximum compressor efficiencies are to be available at the rated load and in a range of a low-end apex torque of the internal combustion engine; and the compressor wheel is to have a minimum moment of inertia.

Simultaneous satisfaction of all the preconditions mentioned would be possible only to a limited extent with a conventional compressor without additional measures. For example, the following conflicting aims would arise from opposing trends:

reduction in the moment of inertia of the compressor and maximization of the characteristic map width and of the peak efficiency, reduction of scavenging in the region of the low-end apex torque and maximization of the specific rated power, improvement of the response and increase in the specific rated power of the internal combustion engine.

The stated conflicting aims could be resolved by a compressor design which has a wide characteristic map with a minimum moment of inertia and maximum efficiencies on the full-load curve of the engine.

Apart from the steady-state requirements mentioned, stable operating behavior of the compressor must also be ensured in transient operating states, for example in the case of rapid load shedding by the internal combustion engine. This means that the compressor must also not enter the state of so-called surging if the conveyed compressor mass flow is suddenly reduced.

While being restricted to the compressor inlet of an exhaust-gas turbocharger, the aforementioned solution has hitherto been achieved by additional measures, such as adjustable inlet guide vanes, measures for reducing an inlet cross section of the compressor or a fixed recirculation channel, also referred to as a ported shroud or characteristic map-stabilizing measure. In the case of the variable solutions, the widening of the useful working range of the compressor is achieved through active shifting of the characteristic map. In this regard, during engine operation at low rotational speeds and throughputs, the compressor characteristic map is shifted to the left toward low mass flows, while, during engine operation at high rotational speeds and throughputs, the compressor characteristic map is not shifted or is shifted to the right.

Through the setting of vane angles and the induction of a pre-swirl in or counter to the direction of rotation of the compressor wheel, shifting of the entire compressor characteristic map toward relatively low or relatively high throughputs is realized by the inlet guide vanes. However, the adjusting mechanism of the inlet guide vanes constitutes a delicate, complicated and expensive solution.

Shifting of the compressor characteristic map toward relatively low throughputs is realized by the measures involving narrowing of the compressor inlet by cross-section reduction, in that the inlet cross section is reduced by closing the structure immediately in front of the compressor. In the open state, exposure of the entire inlet cross section again is realized as far as possible by the measures and, in this way, influencing or shifting of the characteristic map is realized either not at all or only marginally by said measures. Possible solutions of this kind are described in US 2016/ 265424 A1 or DE 10 2011 121 996 A1.

The fixed recirculation channel is a passive solution. It extends the useful characteristic map range of the compressor without fundamentally causing the characteristic map thereof to shift. In relation to the inlet guide vanes and the variable cross-section reduction described, it constitutes a significantly more expedient but, at the same time, less efficient solution.

For the purpose of avoid surging in the case of rapid load shedding, a so-called overrun air recirculation valve is usually used, said valve, in the case of a sudden decrease in the mass flow of charge air through the engine, opening a bypass from the compressor outlet to the compressor inlet and in this way keeping the compressor in the stable characteristic map range to the right of the surge limit. A combination of active measures, such as variable inlet guide vanes and the overrun air recirculation valve, is conceivable but unusual.

SUMMARY

Embodiments of the invention are directed to a charging device which contributes to efficient operation of the charging device.

A compressor, for example a radial compressor, for a charging device of an internal combustion engine is disclosed. The compressor has a compressor wheel which is arranged for conjoint rotation on a rotatably mounted rotor shaft. The compressor has an air supply channel for conducting an air mass flow to the compressor wheel. The compressor has an iris diaphragm mechanism which is arranged upstream of the compressor wheel and which has multiple lamellae, adjustable via a rotatably mounted adjusting ring, for closing or opening a diaphragm opening, such that variable setting of a flow cross section for the air mass flow, for flow against the compressor wheel, is possible. The compressor has an actuator having an actuator shaft, which actuator is mechanically coupled to the adjusting ring for transmitting a torque of the actuator shaft to the adjusting ring for the purpose of rotating the adjusting ring. For the mechanical coupling, a pivotable coupling pin is arranged eccentrically on the actuator shaft and has a bearing bush which is displaceable along a longitudinal axis of the coupling pin. The bearing bush is for example a slide bearing bush. The bearing bush is mounted between two fingers of an adjusting lever of the adjusting ring so as to be displaceable along the fingers on the fingers. An outer contact surface of the bearing bush is spherical. Inner contact surfaces of the two fingers are cylindrical so as to correspond to the spherical outer contact surface of the bearing bush and are in sliding contact with the outer contact surface of the bearing bush.

The compressor for the charging device provides a variable iris diaphragm mechanism which is typically arranged directly in front of the compressor inlet for shifting of the characteristic map. The iris diaphragm mechanism may also be referred to as iris diaphragm or iris throttle and has the task of setting the inlet mass flow of the compressor by way of stepless variation of the flow cross section. In this case, the iris throttle acts like a kind of mask for an outer region of the compressor inlet. With increasing throttling, i.e. cross-sectional narrowing, the iris throttle performs the function of an overrun air recirculation valve at the same time, since it may prevent surging of the compressor. This makes it possible to actively influence the operating range of the compressor and, in addition, to keep the compressor at a stable operating point in the event of sudden load shedding by the engine.

The iris diaphragm mechanism has multiple lamellae which are able to be displaced one inside the other by rotation. The iris diaphragm mechanism is mounted on or in a fixed housing. Each lamella is mounted not only in or on the fixed housing but also on a movably mounted adjusting ring. The housing is for example a separate housing of the iris diaphragm mechanism, part of the compressor housing of the charging device, or of multi-part form, for example by a part of the compressor housing and a separate, additional housing part. The housing is for example of ring-shaped form or has a ring-shaped portion. The lamellae are synchronized and moved jointly via the adjusting ring. Rotation of the adjusting ring also triggers rotation of the lamellae. When the lamellae are rotated parallel to the axis of rotation of the compressor wheel, the lamellae pivot radially inward and thus cause a desired narrowing of the flow cross section directly in front of the compressor wheel. The adjusting ring itself is actuated and moved via the actuator. The actuator is for example an electrically or pneumatically operated control element.

A lamella has a substantially plate-like and/or planar lamella main body, which serves for the screening of the air mass flow and thus for the setting of the diaphragm aperture. For the mounting on the housing and adjusting ring, a lamella has for example two holding elements (also actuation elements), which, for example, are each arranged in a fastening portion of the lamella main body. A holding element is for example in the form of a holding pin or pin-like holding body. A holding element typically extends normal to a main plane of extent of the lamella main body. The fastening portions may be formed for example as a first and second end or as a first and second end region of the respective lamella. The two fastening portions of a lamella typically have identical wall thicknesses.

The air supply channel is formed in the compressor. For example, the air supply channel is formed at least partially by the compressor housing, the iris diaphragm mechanism, an intake connector and/or other components of the compressor.

The compressor further provides a particularly efficient and advantageous mechanical coupling of the actuator to the adjusting ring for the actuation thereof. By means of the spherical, for example ball-shaped, bearing bush, it is possible for the torque generated by the actuator to be transmitted precisely to the adjusting ring at each operating point without additional forces or resistances on the iris diaphragm mechanism itself or on other components of the compressor being induced in the process. In particular, the coupling according to the embodiments to the adjusting ring contributes to the fact that a relatively small torque is required for controlling the adjusting ring. This additionally contributes to particularly low wear with respect to the mechanism and the coupling. The guidance of the spherical, for example ball-shaped, bush on corresponding cylinder surfaces of approximately the same radius gives rise to a linear sliding contact, which, owing to a relatively low Hertzian pressure, is shown to be advantageous in comparison with pure point contacting.

A further advantage of the coupling described is that axes of rotation of the actuator shaft and the adjusting ring do not necessarily have to intersect. Consequently, embodiments in which said axes intersect or do not intersect are conceivable. Furthermore, it is not absolutely necessary for the two previously mentioned axes to be oriented at a 90° angle to one another. Other angles, less than 90°, are also possible. In the case of such angles, the angle is the smallest angle formed between the two axes. In this way, it is possible for example for installation space-related constraints or specifications to be taken into consideration.

A further advantage is that it is possible for manufacturing accuracy of the fingers of the adjusting lever, of the bearing bush and of the coupling pin to be not particularly high, but by contrast to be relatively low with regard to the manufacturing tolerances. In this way, production and manufacturing costs may be lowered.

A further advantage is that the mechanism described contributes to non-transmission of any axial forces to the adjusting ring by the actuator. The axial forces are those forces which would act axially with respect to an axis of rotation of the adjusting ring. This contributes to longevity and low likelihood of failure of the described coupling means and thus ultimately also of the compressor and thus of a charging device.

The advantages are brought about in that the bearing bush itself is mounted longitudinally displaceably on the coupling pin, for example along an axis of rotation or longitudinal axis of the for example cylindrical coupling pin. Here, the bearing bush, in the coupled state, is captively arranged on the coupling pin. In addition, it is optionally possible for provision to be made of an axial securing element, for example a securing ring, for assembly or else for operation, in order to hold the bearing bush on the coupling pin. The coupling pin itself is, via the bearing bush, additionally mounted so as to be displaceable and/or slidable along the fingers of the adjusting lever on said fingers. For example, the coupling pin is mounted so as to be displaceable and/or slidable relative to the fingers along a displacement direction which is perpendicular to the longitudinal axis of the coupling pin, or along a displacement direction which is perpendicular to an axis of rotation of the actuator shaft, on said fingers. Furthermore, owing to the spherical/cylindrical contact with the bearing bush, the adjusting lever is, via the fingers, rotatable in a mutually relative manner about an axis of rotation running perpendicular to the longitudinal axis of the coupling pin. The axis of rotation corresponds for example to a common imaginary cylinder axis of the cylindrically shaped contact surfaces of the fingers.

In summary, when the actuator shaft is actuated, the coupling pin, via the bearing bush, may, relative to the fingers, be displaced or slide on said fingers in two translatory directions and additionally rotate relative to the fingers. The coupling thus provides for at least three degrees of freedom.

According to one embodiment, the bearing bush is mounted so as to be rotatable about the longitudinal axis of the coupling pin. This contributes further to the advantages and functions above. In particular, this allows the bearing bush to roll on the fingers when displaced longitudinally along the fingers. In this way, wear due to friction is reduced. The coupling thus provides for four degrees of freedom, two rotational and two translatory.

According to one embodiment, an axis of rotation of the actuator shaft and an axis of rotation of the adjusting ring do not intersect. This allows particularly flexible usability of the compressor, wherein, according to spatial and structural conditions, it is possible for the actuator to be coupled to the adjusting ring with different orientations of the axes of rotation to one another. According to an alternative embodiment, the axes of rotation intersect. This contributes to a more compact design.

According to a further configuration, the axes of rotation of the actuator shaft and of the adjusting ring are oriented perpendicular to one another. In this way, the coupling pin moves in a first plane of rotation and the adjusting ring moves in a second plane of rotation, wherein the two planes of rotation are perpendicular to one another.

According to a further configuration, during the opening or closing of the diaphragm aperture, a dimension of fit between the inner contact surfaces of the fingers and the outer contact surface of the bearing bush is constant. This contributes to uniform and low wear with the actuation of the mechanism. In particular, owing to the many degrees of freedom with the mounting of the coupling pin on the adjusting ring, it is made possible that the gap dimension remains constant. This allows a constant transmission of force at each operating point of the adjustment mechanism.

According to one embodiment, a transition fit is formed between the inner contact surfaces of the fingers and the outer contact surface of the bearing bush. In this way, provision is made of only a small, or even no, gap dimension between the two stated elements. For example, the two elements overlap. This makes it possible to achieve a fixed fit between the two elements, such that for example particularly low, or even no, noise emissions and vibrations arise during the actuation of the mechanism (keyword NVH: noise, vibration and harshness).

According to one embodiment, a securing element, for example a securing ring, is arranged on the coupling pin so as to secure the displaceable bearing bush on the coupling pin.

According to one embodiment, the bearing bush comprises a plastic material or consists thereof. Consequently, acoustic transmission behavior and damping properties are considerably improved because contact between moving parts takes place for example in each case only between plastic and metal.

Also disclosed is a charging device for an internal combustion engine having a rotor bearing in which a rotor shaft is rotatably mounted, and having a compressor according to one of the previously described embodiments. The charging device is designed as an exhaust-gas turbocharger or as an electromotively operated charger or as a charger operated via a mechanical coupling to the internal combustion engine. Thus, for example, the charging device is designed as an exhaust-gas turbocharger which has an exhaust-gas turbine for driving the compressor impeller of the compressor or, alternatively, is designed as an electromotively operated charger (also referred to as an E booster), which has an electromotive drive for driving the compressor impeller of the compressor. As an alternative to the abovementioned embodiments, the charging device may furthermore also be designed as a charger operated via a mechanical coupling to the internal combustion engine. Such a coupling between the internal combustion engine and the radial compressor may be accomplished by means of an intermediate transmission, for example, which is operatively connected to a rotating shaft of the internal combustion engine, on the one hand, and to the rotor shaft of the radial compressor, on the other hand.

The charging device substantially allows the above-stated advantages and functions. In particular, the above-described compressor is suitable in all embodiments both for an exhaust-gas turbocharger, in which, as mentioned at the beginning, a turbine is driven by an exhaust-gas mass flow, and for an electromotively operated charger. An electromotively operated charger or a charging device having an electromotively operated charger is also referred to as a so-called E booster or E compressor.

BRIEF DESCRIPTION OF THE DRAWINGS

An embodiment of the invention will be described below with the aid of the appended figures. Identical elements or elements of identical action are provided with the same reference signs throughout the figures.

In the figures:

FIGS. 2A to 2C show schematic plan views of the iris diaphragm mechanism in three different states.

DETAILED DESCRIPTION

Figure 1:
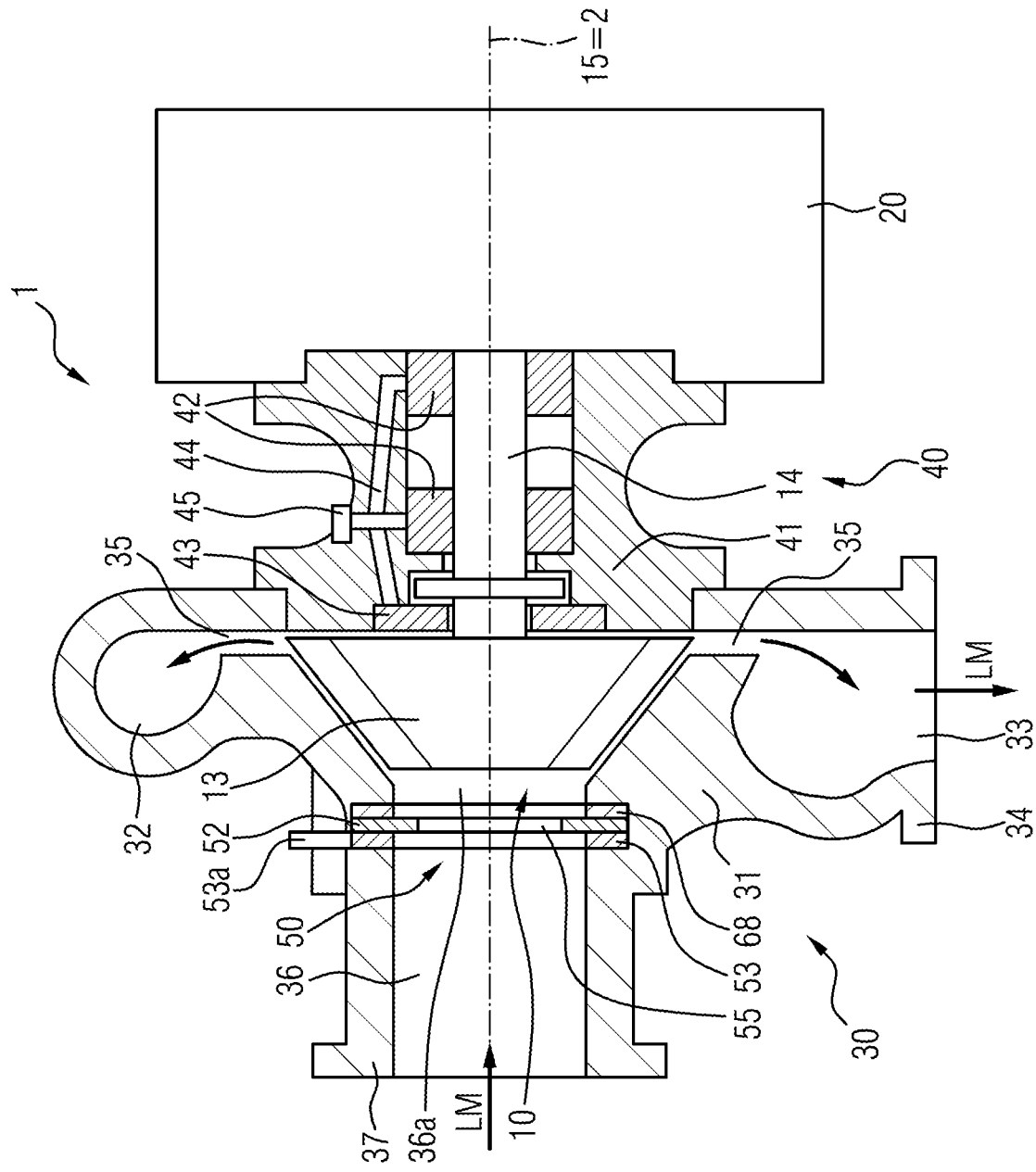
FIG. 1 shows a schematic sectional view of a charging device with a compressor with an iris diaphragm mechanism.

FIG. 1 schematically shows, in a sectional illustration, an example of a charging device 1, which includes a compressor 30 (a radial compressor in this case), a rotor bearing 40 and a drive unit 20. The compressor 30 has an optional overrun air recirculation valve (not illustrated), and an air mass flow LM is also indicated by arrows. A so-called charger rotor 10 of the charging device 1 has a compressor impeller 13 (also referred to as compressor wheel) and a rotor shaft 14 (also referred to as shaft). The charger rotor 10 rotates about a rotor axis of rotation 15 of the rotor shaft 14 during operation. The rotor axis of rotation 15 and at the same time the charger axis 2 (also referred to as longitudinal axis) are illustrated by the indicated center line and identify the axial orientation of the exhaust-gas charging device 1. The charger rotor 10 is supported with its rotor shaft 14 by means of two radial bearings 42 and one axial bearing disk 43. Both the radial bearings 42 and the axial bearing disk 43 are supplied with lubricant via oil supply channels 44 of an oil connection 45.

In this example, a charging device 1, as illustrated in FIG. 1, has a multi-part construction. Here, a housing of the drive unit 20, a compressor housing 31 which is able to be arranged in the intake tract of the internal combustion engine, and a rotor bearing 40 which is provided between the housing of the drive unit 20 and the compressor housing 31 are arranged next to one another with respect to the common charger axis 2 and are connected together in terms of assembly, wherein alternative arrangements and configurations of drive units and rotor bearings are also possible.

The charger rotor 10 constitutes a further structural unit of the charging device 1 and has at least the rotor shaft 14 and the compressor impeller 13, which compressor impeller is arranged in the compressor housing 31 and has an impeller blade arrangement 131. The compressor impeller 13 is arranged at one end of the rotor shaft 14 and is connected rotationally conjointly to the latter. The rotor shaft 14 extends in the direction of the charger axis 2 axially through the bearing housing 41 and is provided therein with rotary support in the axial and radial directions about its longitudinal axis, the rotor axis of rotation 15, wherein the rotor axis of rotation 15 lies in the turbocharger axis 2, i.e. coincides therewith.

The compressor housing 31 has an air supply channel 36, which optionally has an intake pipe connector piece 37 for connection to the air intake system (not illustrated) of the internal combustion engine and runs in the direction of the charger axis 2 toward the axial end of the compressor impeller 13. Via this air supply channel 36, the air mass flow LM is drawn in from the air intake system by the compressor impeller 13 and conducted to the compressor wheel 13. The air supply channel 36 may also be part of an intake connector and thus not part of the compressor housing 31. The air supply channel 36 adjoins for example the compressor housing 31 and forms a compressor inlet 36a for the conducting of the air mass flow LM to the compressor impeller 13.

Furthermore, the compressor housing 31 generally has a ring-shaped channel which is arranged in a ring-shaped manner around the charger axis 2 and the compressor impeller 13 and which widens in a spiral-shaped manner away from the compressor impeller 13, and which is referred to as a spiral channel 32. Said spiral channel 32 has a gap opening which runs at least over a part of the inner circumference and which has a defined gap width, the so-called diffuser 35, which, directed in a radial direction away from the outer circumference of the compressor impeller 13, runs into the spiral channel 32 and through which the air mass flow LM flows away from the compressor impeller 13 at elevated pressure into the spiral channel 32.

The spiral channel 32 furthermore has a tangentially outwardly directed air discharge channel 33 with an optional manifold connector piece 34 for connection to an air manifold (not illustrated) of an internal combustion engine. Through the air discharge channel 33, the air mass flow LM is conducted at elevated pressure into the air manifold of the internal combustion engine.

In FIG. 1, the drive unit 20 is not shown in any more detail and may be embodied either as an exhaust-gas turbine or as an electromotive drive unit or else as a means for mechanically coupling to the internal combustion engine, for example as an intermediate transmission which is operatively connected to a rotating shaft of the internal combustion engine, this making the charging device 1 an exhaust-gas turbocharger in one case and an electromotively operated charger, also referred to as an E booster or E compressor, or a mechanical charger in the other case. In the case of an exhaust-gas turbocharger, provision would be made opposite the compressor wheel 13 for example of a turbine impeller (also referred to as a turbine wheel), which would likewise be arranged for conjoint rotation on the rotor shaft 14 and be driven by an exhaust-gas mass flow.

Upstream of the compressor impeller 13 in the air mass flow LM, an iris diaphragm mechanism 50 is, in addition to or as an alternative to an overrun air recirculation valve (see FIG. 1), arranged in the air supply channel 36 immediately in front of a compressor inlet 36a (also compressor entry), and/or forms at least one sub-region of the air supply channel 36 immediately in front of the compressor inlet 36a of the compressor housing 31. With regard to its functional principle, the iris diaphragm mechanism 50 is similar to an iris diaphragm in a camera. The iris diaphragm mechanism 50 is designed to at least partially close or open a diaphragm aperture such that variable setting of a flow cross section for the air mass flow LM, for flow against the compressor impeller 13, is possible, at least over a sub-region of the flow cross section. The iris diaphragm mechanism 50 allows a characteristic map shift for the compressor 30 in that it acts as a variable inlet throttle for the compressor wheel 13.

FIGS. 2A to 2C schematically show the iris diaphragm mechanism 50 of the charging device 1 in three different operating states. The iris diaphragm mechanism 50 is fixed on or in the compressor housing 31 and/or at least partially forms the latter. Alternatively, the iris diaphragm mechanism 50 is mounted on or in a separate, fixed housing for the iris diaphragm mechanism 50. Alternatively, the iris diaphragm mechanism 50 is mounted on or in a multi-part housing, wherein a part of the multi-part housing is formed by the compressor housing 31 and a part is formed by an additional, separate housing (element). The iris diaphragm mechanism 50 has a bearing ring 68 which is fixed in the air supply channel 36 so as to be concentric with the compressor inlet 36a, an adjusting ring 53 which is arranged so as to be concentric with said bearing ring and is rotatable about a common center and has an adjusting lever 53a, and a plurality of lamellae 52 which are mounted so as to be rotatable about a respective center of rotation in the bearing ring 68. Instead of the bearing ring 68, the compressor housing 31 or another housing (element) may also serve as a bearing. The lamellae 52 have for example a plate-like lamella main body and at least one pin-like actuating element (not visible here), which is designed for actuating the respective lamella 52, as integral constituent parts of the respective lamella 52.

The lamellae 52 are also rotatable and/or displaceable on the adjusting ring 53, for example by means of the actuating element. In the example, the adjusting ring 53 has three grooves 54 (indicated in the Figures) for the mounting/guiding of the lamellae 52. The lamellae 52 are synchronized and moved via the adjusting ring 53. The adjusting ring 53 is mounted for example on or in the housing. By actuation of the adjusting ring 53, the lamellae 52 are pivoted radially inward and narrow a diaphragm aperture 55 of the iris diaphragm mechanism 50. Here, FIG. 2A shows the diaphragm aperture 55 with a maximum opening width (open position), FIG. 2B shows the diaphragm aperture 55 with a reduced opening width, and FIG. 2C shows the diaphragm aperture 55 with a minimum opening width (closed position).

Figure 3:
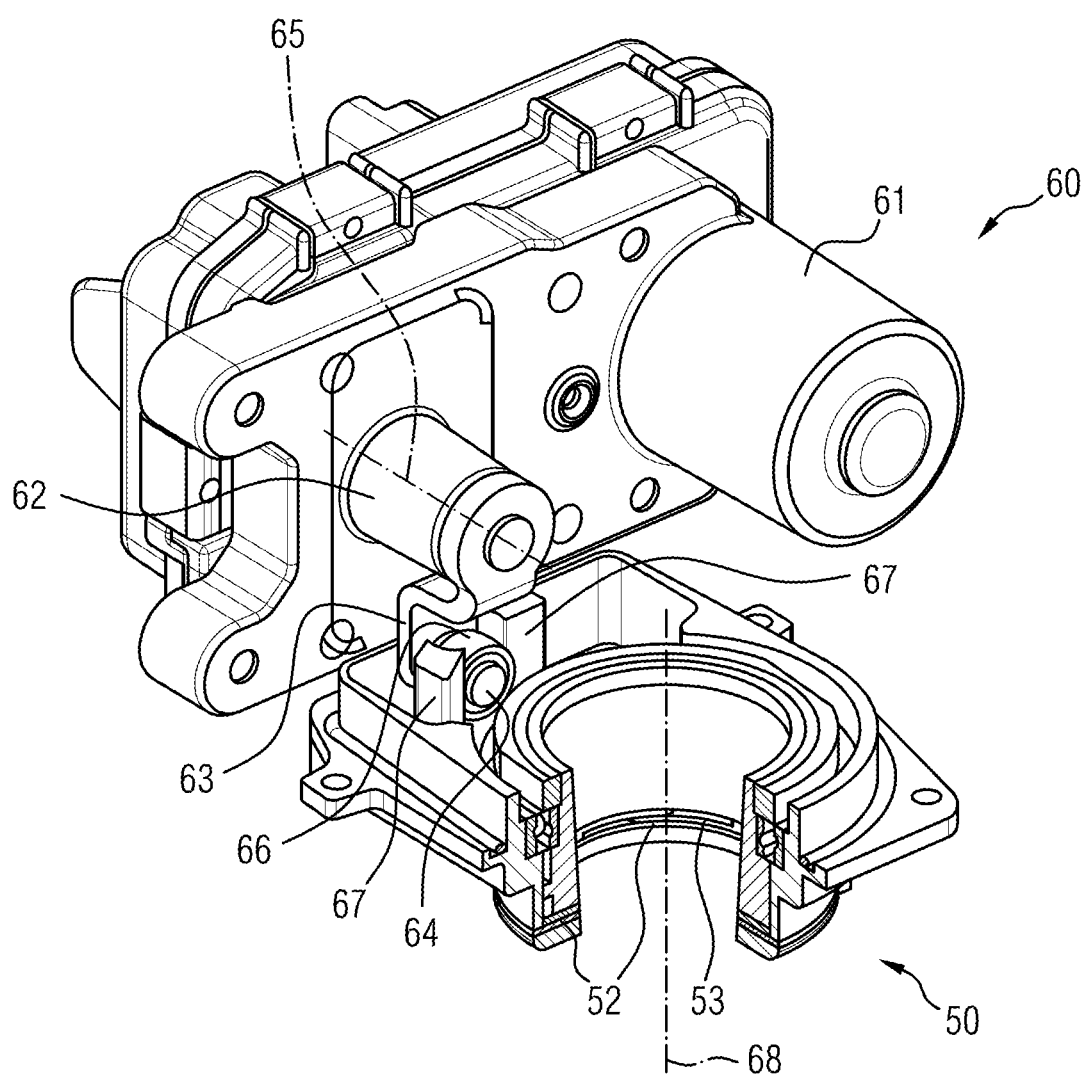
FIG. 3 shows a perspective view of an assembly with an actuator and with an iris diaphragm mechanism as per an embodiment of the invention.
Figure 4A:
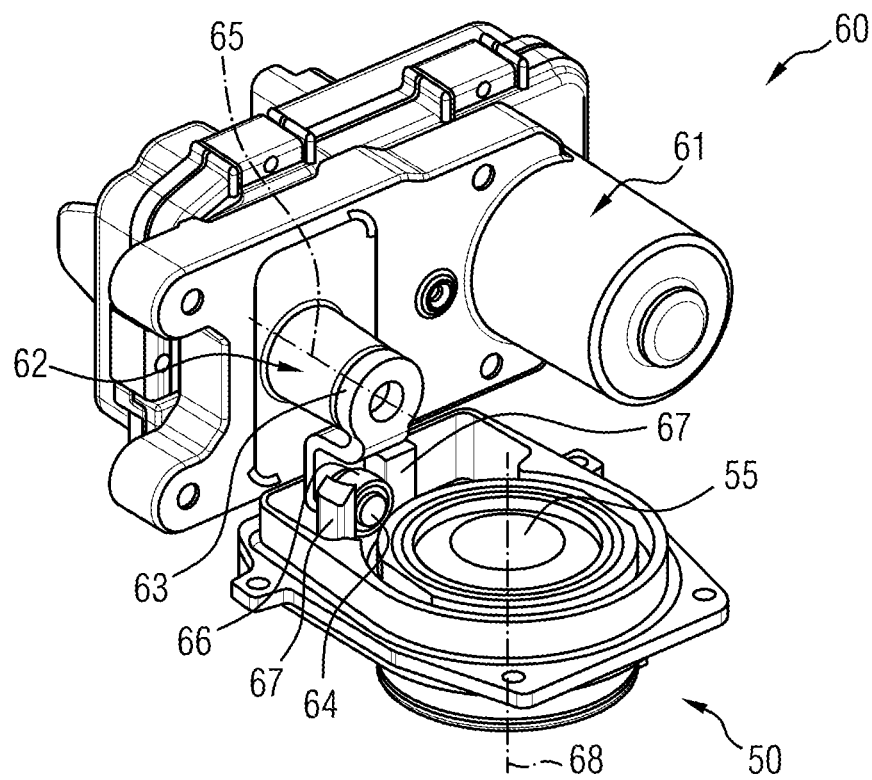
FIGS. 4A and 4B show the assembly as per an embodiment of the invention in an open state and a closed state.
Figure 4B:
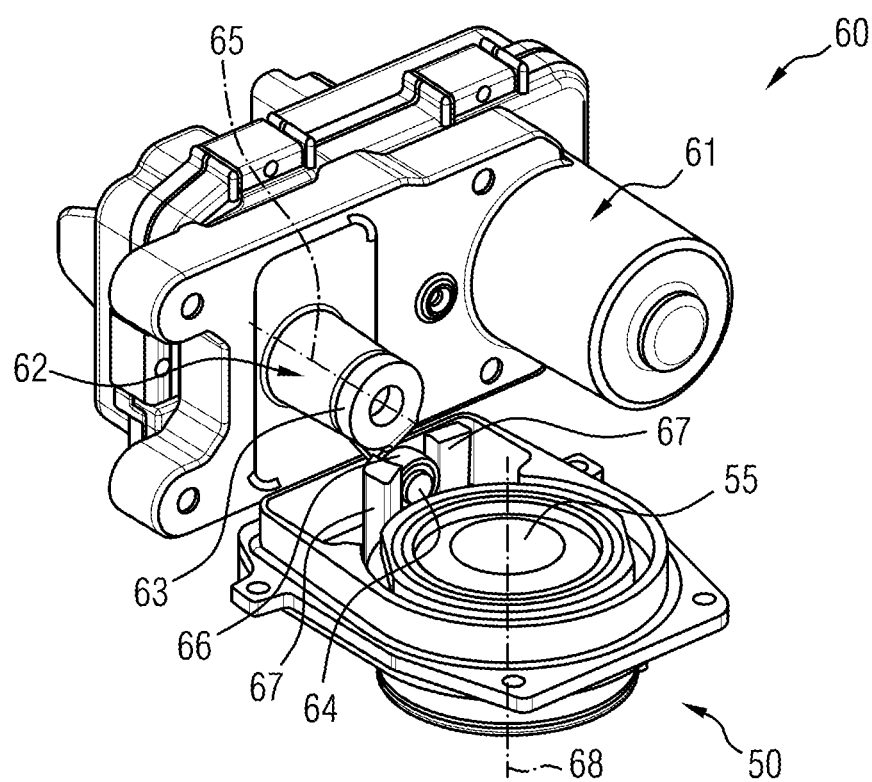
Figure 5A:
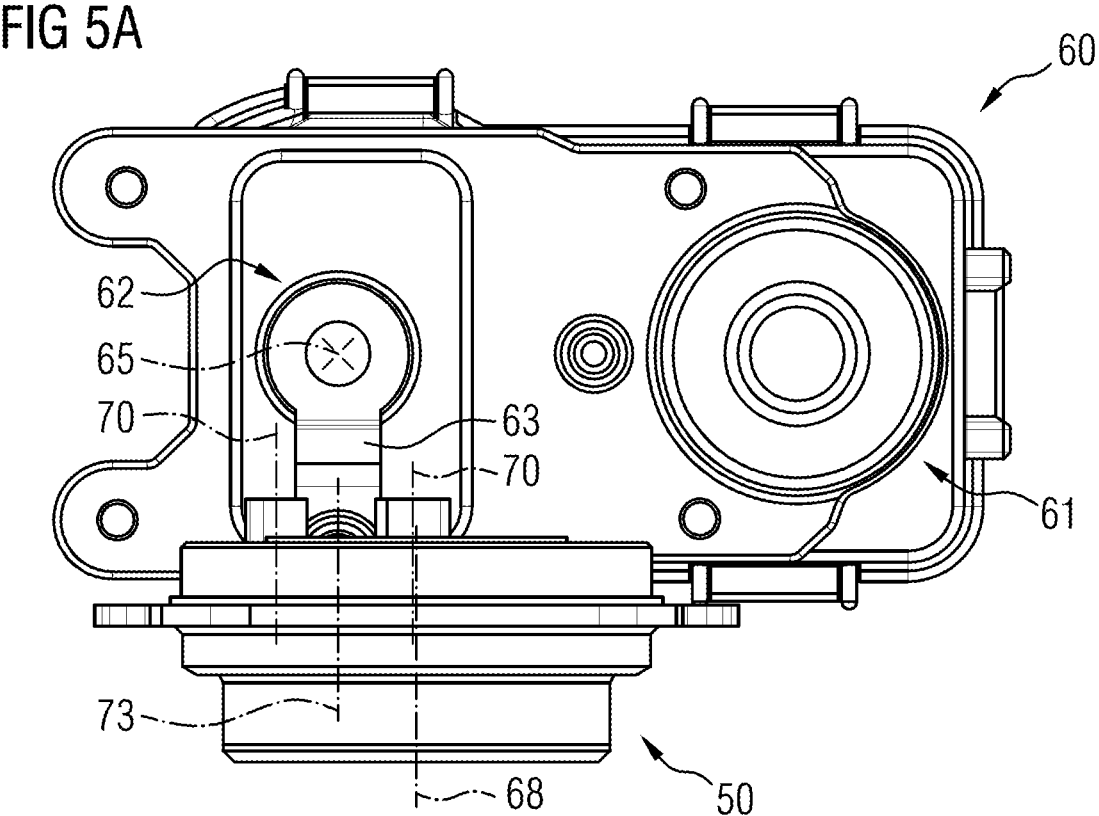
FIGS. 5A and 5B show side views of the assembly in the open state and in the closed state.
Figure 5B:
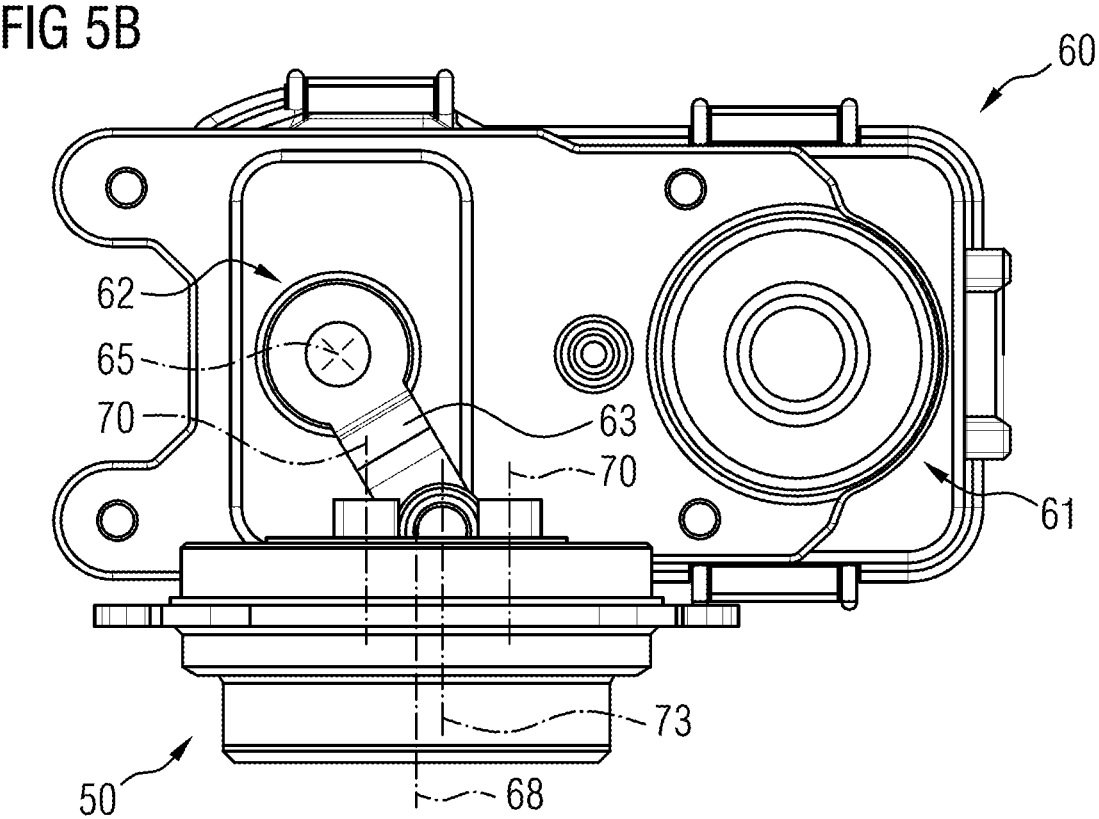

FIG. 3 shows, in a perspective, partially cut-away view, an assembly 60 with an iris diaphragm mechanism 50 and with an actuator 61 as per the embodiment of the invention. The assembly 60 is for example part of the compressor 30 of the charging device 1 that is described with reference to FIGS. 1 and 2A to 2C. FIGS. 4 to 6 show the assembly 60 in perspective views, side views and partially sectioned views, the suffixes "a" and "b" in each case being representative of the above-described open position and closed position of the iris diaphragm mechanism 50.

The actuator 61 has an actuator shaft 62 which is able to be set in rotation. A coupling bar 63 is arranged for conjoint rotation on the rotatable actuator shaft 62, and a coupling pin 64 is in turn arranged on said coupling bar eccentrically with respect to the actuator shaft. The coupling pin 64 may alternatively also be coupled rotationally conjointly to the actuator shaft in some other way. When the actuator shaft 63 is actuated, this rotates about an actuator axis of rotation 65. A bearing bush or bushing 66 composed of plastic, also referred to as slide bearing bush or slide bush, is pushed onto the coupling pin 64 and is mounted between two fingers 67 of the adjusting lever 53a of the adjusting ring 53. The actuator 61 is thus mechanically coupled to the adjusting ring 53 by means of the coupling pin 64.

When the actuator shaft 62 is actuated, the coupling pin 64 is rotated about the actuator axis of rotation 65 and thereby actuates the adjusting ring 53 of the iris diaphragm mechanism 50. The adjusting ring 53 is mounted to as to be rotatable about an axis of rotation 68. The axis of rotation 68 coincides for example with the rotor axis of rotation 15 mentioned at the beginning. In the embodiment, the actuator axis of rotation 65 and the axis of rotation 68 of the adjusting ring 53 are perpendicular to one another, with the two axes 65, 68 not intersecting one another. This may be clearly seen for example in FIGS. 5A and 5B. The coupling pin 64 and fingers 67 of the adjusting ring 53 rotate in two different planes, which are oriented perpendicular to one another. The resulting kinematic complexity is resolved with the aid of the particular coupling between the actuator 61 and the adjusting ring 53, as described below.

Figure 6A:
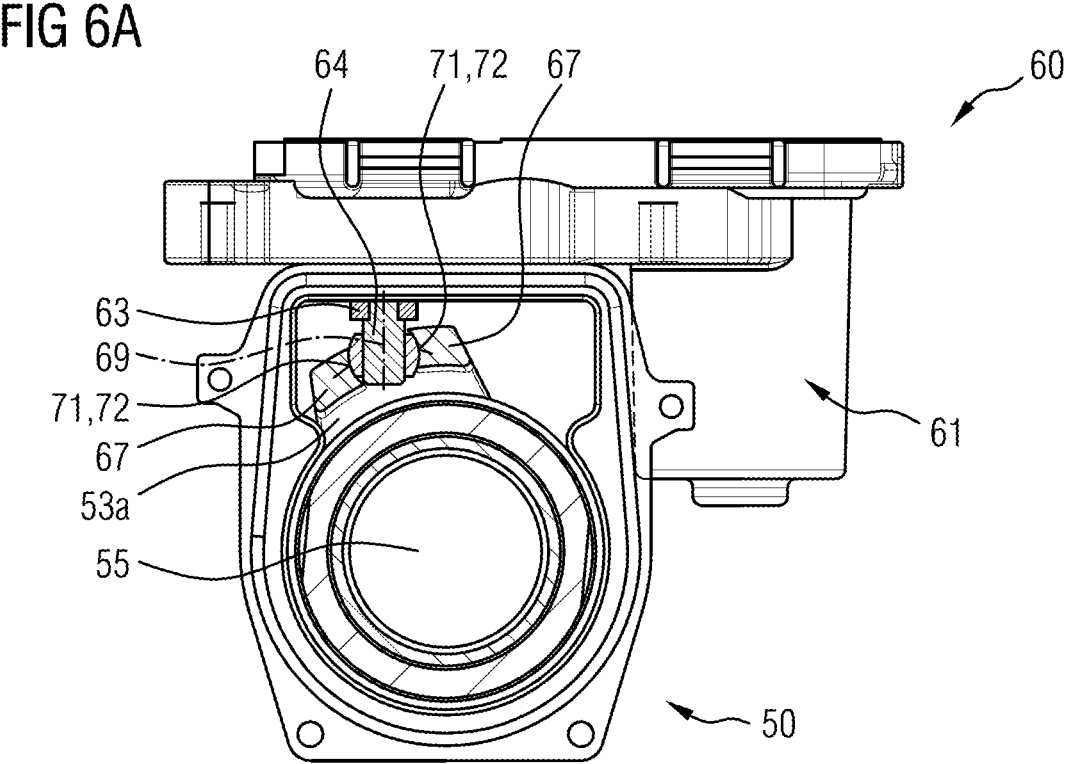
FIGS. 6A and 6B show partially sectioned plan views of the assembly in the closed state and in the open state.
Figure 6B:
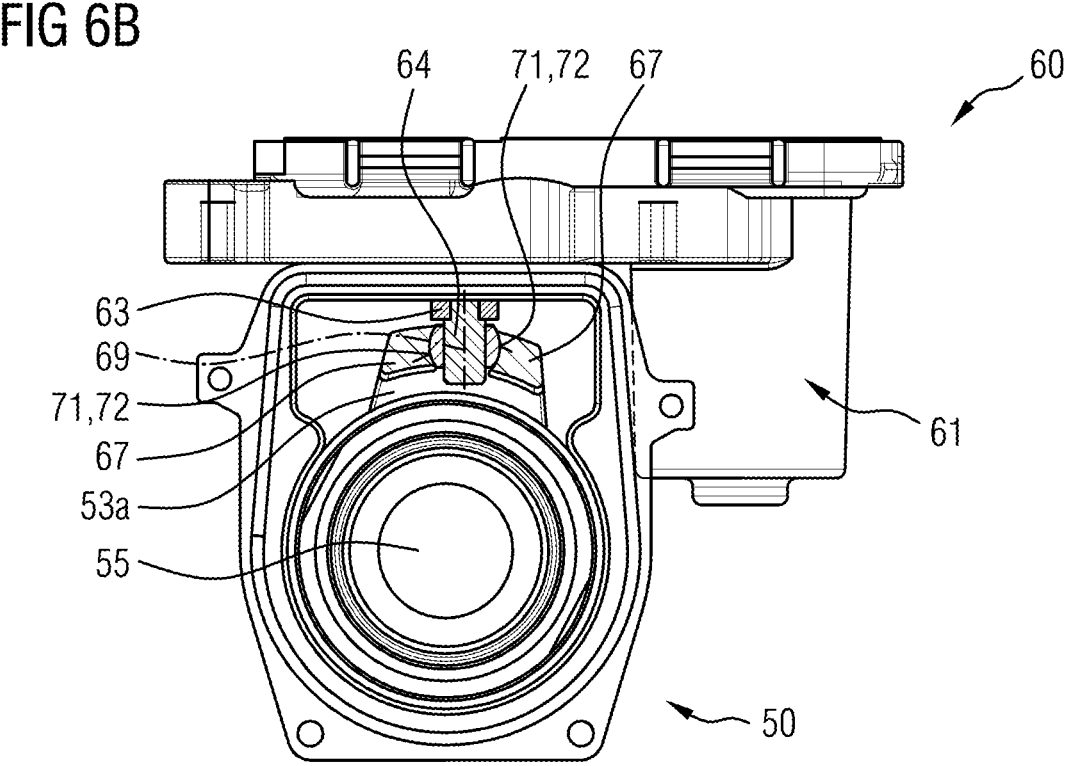

The bearing bush 66 is guided on the coupling pin 64 so as to be displaceable along a longitudinal axis 69 of the coupling pin 64 (see for example FIGS. 6A and 6B). Furthermore, the bearing bush 66 may rotate about the longitudinal axis 69 of the coupling pin 64. Furthermore, the bearing bush 66 and thus the coupling pin 64 are guided between the fingers 67 so as to be displaceable along longitudinal axes 70 of the fingers 67 on said fingers. Expressed in more general terms, the coupling pin 64 and the bearing bush 66 are guided so as to be displaceable in a direction perpendicular to the actuator axis of rotation 65 or perpendicular to the longitudinal axis 69 of the coupling pin 64 on the adjusting lever 53a.

The bearing bush 66 additionally has an outer contact surface 71, which is spherical. The two fingers 67 have opposite one another inner contact surfaces 72 which are formed so as to correspond to the spherically outer contact surface of the bearing bush 66 and have cylindrical shaping. A radius of the inner contact surface 72 corresponds substantially to the radius of the spherical outer contact surface 71 of the bearing bush 66. In this way, it is possible for the bearing bush 66 to be able to rotate about an axis of rotation 73 relative to the fingers 67 of the adjusting lever 53a. This may be seen for example with reference to FIGS. 6A and 6B. The axis of rotation 73 runs between the two fingers 67 so as to be perpendicular to the actuator axis of rotation 65 and/or the longitudinal axis 69 of the coupling pin 64. The axis of rotation 73 corresponds to a cylinder axis of the cylindrical contact surfaces 72 that, in cross section, runs through a central point of the radius.

The coupling described allows the coupling pin 64 to be displaced freely, by means of the bearing bush 66, back and forth between the fingers 67, and upward and downward relative to the adjusting lever 53a, without loss of radial contact in the process. In addition, the bearing bush 66 may rotate about the longitudinal axis 69 of the coupling pin 64 without loss of radial contact. Furthermore, the coupling pin 64 may, via the bearing bush 66 guided in the fingers 67, rotate about the axis of rotation 73 relative to the fingers 67 and thus to the adjusting lever 53a. The bearing bush 66 itself, on account of the spherical formation and the guidance in the fingers 67, cannot in the assembled state be detached from the coupling pin 64. It is optionally possible, at least for assembly, for the bearing bush 66 to be secured on the coupling pin 64 with the aid of a securing element or securing ring. The described coupling between the actuator 61 and the adjusting lever 53 makes possible the advantages and functions mentioned at the beginning.

It should be pointed out at this juncture that the compressor 30 described does not necessarily have to be part of the charging device 1 described by way of example in FIG. 1. Rather, the charging device 1 may also be configured differently.

The invention claimed is:

1. A compressor for a charging device of an internal combustion engine, comprising:
   a compressor wheel which is arranged for conjoint rotation on a rotatably mounted rotor shaft;
   an air supply channel for conducting an air mass flow to the compressor wheel;
   an iris diaphragm mechanism which is arranged upstream of the compressor wheel and which has multiple lamellae, adjustable via a rotatably mounted adjusting ring, for closing and opening a diaphragm opening, such that variable setting of a flow cross section for the air mass flow, for flow against the compressor wheel, is possible; and
   an actuator having an actuator shaft, which actuator is mechanically coupled to the adjusting ring for transmitting a torque of the actuator shaft to the adjusting ring for the purpose of rotating the adjusting ring, wherein, for the mechanical coupling,
      a pivotable coupling pin is arranged eccentrically on the actuator shaft and has a bearing bush which is displaceable along a longitudinal axis of the coupling pin,
      the bearing bush is mounted between two fingers of an adjusting lever of the adjusting ring so as to be displaceable along the fingers on the fingers,
      an outer contact surface of the bearing bush is spherical, and
      inner contact surfaces of the two fingers are cylindrical so as to correspond to the spherical outer contact surface of the bearing bush and are in sliding contact with the outer contact surface of the bearing bush.

2. The compressor as claimed in claim 1, wherein the bearing bush is mounted so as to be rotatable about the longitudinal axis of the coupling pin.

3. The compressor as claimed in claim 1, wherein an axis of rotation of the actuator shaft of the actuator and an axis of rotation of the adjusting ring intersect.

4. The compressor as claimed in claim 1, wherein an axis of rotation of the actuator shaft of the actuator and an axis of rotation of the adjusting ring do not intersect.

5. The compressor as claimed in claim 1, wherein an axis of rotation of the actuator shaft of the actuator and an axis of rotation of the adjusting ring are oriented perpendicular to one another.

6. The compressor as claimed in claim 1, wherein an axis of rotation of the actuator shaft of the actuator and an axis of rotation of the adjusting ring are oriented at a predetermined angle less than 90° to one another.

7. The compressor as claimed in claim 1, wherein a transition fit is formed between the inner contact surfaces of the fingers and the outer contact surface of the bearing bush.

8. The compressor as claimed in claim 1, wherein a securing element is arranged on the coupling pin so as to secure the bearing bush on the coupling pin.

9. The compressor as claimed in claim 8, wherein the securing element comprises a securing ring.

10. The compressor as claimed in claim 1, wherein the bearing bush comprises a plastic material.

11. The compressor as claimed in claim 1, wherein the bearing bush consists of a plastic material.

12. A charging device for an internal combustion engine, having a rotor bearing in which a rotor shaft is rotatably mounted, and having a compressor as claimed in claim 1, wherein the charging device is configured as an exhaust-gas turbocharger, as an electromotively operated charger, or as a charger operated via a mechanical coupling to the internal combustion engine.

* * * * *